United States Patent Office 3,752,653
Patented Aug. 14, 1973

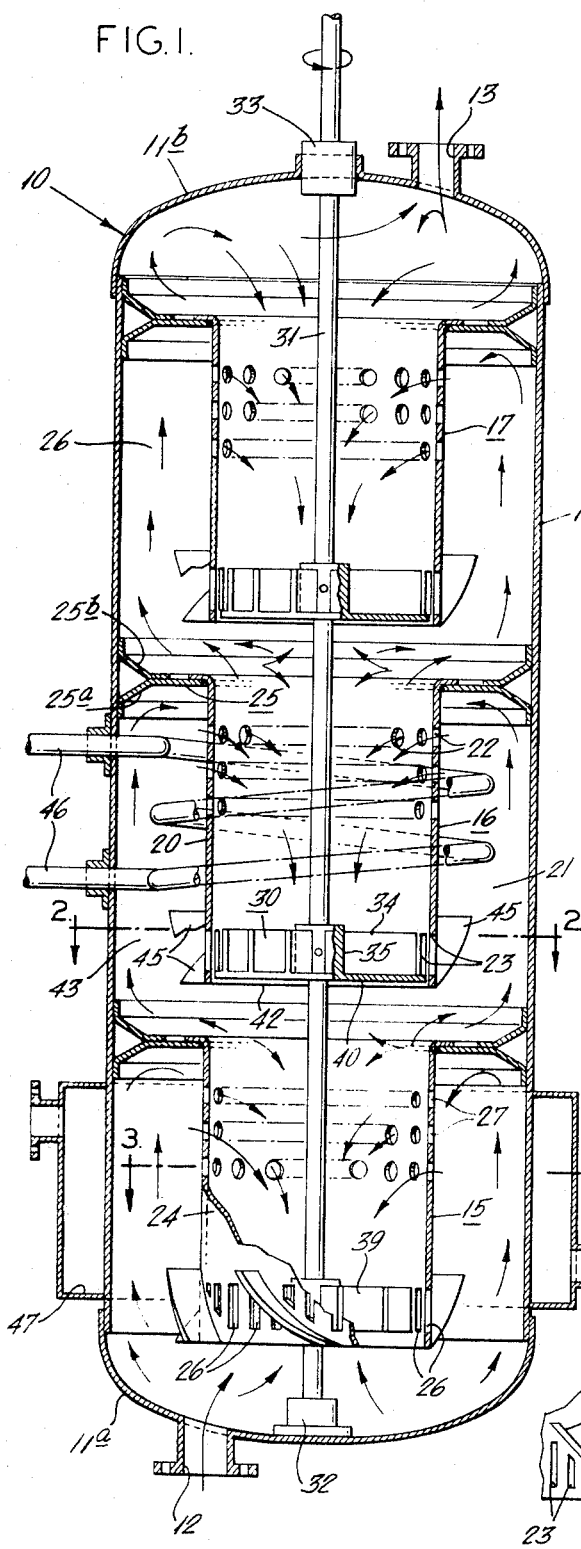
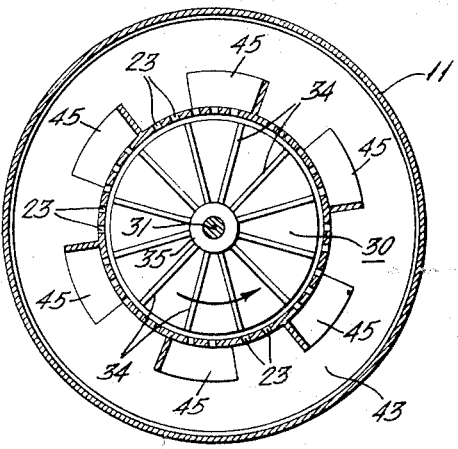
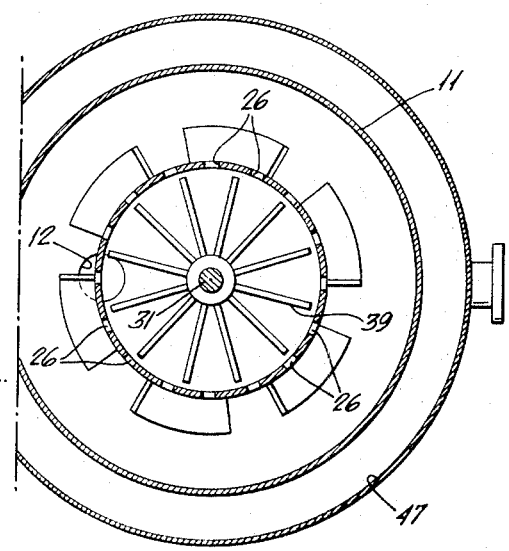
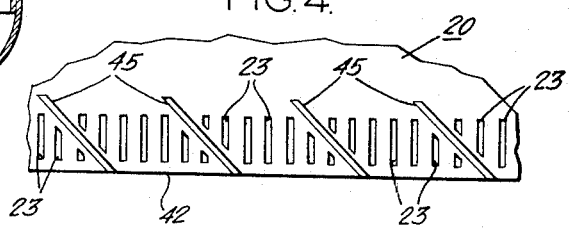

3,752,653
CONTINUOUS-FLOW AGITATED REACTOR
Arthur Phineas Weber, New York, N.Y., assignor to The Bethlehem Corporation, Bethlehem, Pa.
Filed Nov. 12, 1971, Ser. No. 198,301
Int. Cl. B01j 1/00; C08f 1/98
U.S. Cl. 23—283       9 Claims

ABSTRACT OF THE DISCLOSURE

A hollow elongated shell having an inlet and an outlet at opposite ends has a series of agitating assemblies mounted at axially-spaced locations in the shell. Each agitating assembly includes a hollow draft tube having inlet port means at one end communicating with the corresponding end of an annular flow passage between the draft tube and shell and outlet port means at the opposite end communicating with the other end of the passage. An impeller is mounted for rotation in the draft tube adjacent the outlet port means to flow the process ingredients axially through the draft tube and outwardly through the outlet ports where the ingredients are mixed with ingredients flowing into the other end of the passage. Baffle means is associated with the outlet ports to redirect the flow of the reacted ingredients after they exit the outlet ports and to break up any swirl caused by the impeller. The impeller and baffle means cooperate to provide hydraulic and mechanical shear forces on the ingredients to improve reaction in the apparatus.

---

The present invention relates to chemical reaction apparatus of the type which operates to react ingredients as they flow continuously through the apparatus.

At present, there is a growing trend toward the use of continuous-flow chemical reactors as replacements for batch-type reactors employed heretofore. The continuous-flow reactors are readily adapted to be used with on-stream chemical composition analyzers and on-line computers to effect cost savings in the production of various chemical products. For example, such reactors find particular applicability in the polymerization of resins and in other chemical reactions where a significant residence period in the reactor is required to satisfy reaction kinetics. A typical continuous-flow reactor is disclosed schematically at page 28 of my article entitled "The Design of Commercial Continuous Reactor Systems" in the January 1953 issue of Chemical Engineering Progress magazine.

In the conventional continuous-flow reactor, a closed-vessel having an inlet and an outlet is provided with a central draft tube having a series of inlet apertures at one end and a single central exhaust outlet at its other end through which the process material is flowed by means of impeller blades spaced apart axially inside the draft tube. The blades recirculate the process material in the vessel and through the draft tube while the material is being reacted. The presence of the draft tube in the vessel makes possible a computation of the residence time of the material in the vessel, and hence, the completeness of reaction. Although conventional reactors operate satisfactorily, a continuous-flow reactor which has an improved agitating capability is highly desirable.

With the foregoing in mind, it is the primary object of the present invention to provide an improved continuous-flow reactor.

It is another object of the present invention to provide a continuous-flow reactor having novel agitating means for improving the reaction capabilities of the reactor.

As a further object, the present invention provides a multi-stage continuous-flow reactor having means for applying increased hydraulic and mechanical shear forces on process material flowing through the reactor to improve the performance of the reactor.

More specifically, the present invention provides a multi-stage reactor comprising a hollow cylindrical shell having an inlet and an outlet and mounting at axially-spaced locations a plurality of agitating assemblies for mixing and reacting process materials as they advance through the shell. Each agitating assembly includes a hollow cylindrical draft tube disposed coaxially within the shell and having inlet port means at one end and outlet port means at its other end. A partition extends transversely of the shell adjacent the inlet ports of the draft tube to divert materials flowing in an annular passage around the draft tube into the inlet ports. The materials flowing into the inlet ports are pumped through the draft tube and out the outlet ports by means of an impeller mounted for rotation in the draft tube adjacent the outlet ports and having a baffle plate for directing the process material radially outward through the outlet ports. A series of pitched vanes are mounted at peripherally-spaced locations to the outside of the draft tube adjacent the outlet ports to redirect the process materials flowing through the outlet ports to prevent the process materials from swirling as they exit from each stage. If desired, a heat-exchanger may be provided to supply or extract heat in selected stages depending on the desired operating temperatures of the reactor.

These and other objects, features and advantages of the present invention should become apparent from the following description when taken in conjunction with the accompanying drawings in which:

FIG. 1 is a longitudinal sectional view of a reactor embodying the present invention;

FIG. 2 is a sectional view taken along line 2—2 of FIG. 1;

FIG. 3 is a sectional view taken along line 3—3 of FIG. 1; and

FIG. 4 is a developed view of a fragment of the lower portion of a draft tube and illustrating vanes for preventing swirl in the reactor.

Referring now to the drawings, there is illustrated in FIG. 1 a continuous-flow reactor 10 embodying the present invention. As seen therein, the reactor 10 comprises an elongated hollow cylindrical shell 11 having closed ends 11a and 11b with an inlet 12 in its lower end 11a and an outlet 13 in its upper end 11b. The inlet 12 and outlet 13 are flanged to facilitate connection to a source of process materials under pressure. The pressure at the inlet 12 is greater than the pressure at the outlet 13 so that the process materials are normally flowed in a generally upward direction through the reactor.

According to the present invention, the process materials entering the inlet 12 are agitated as they flow upwardly and are reacted. To this end, a series of three agitating assemblies 15, 16 and 17 are mounted in the shell 11. Because each assembly is like the other, except for the initial assembly 15, which differs for reasons to be set forth hereinafter, reference is made to the construction of the intermediate assembly 16 which is identical to the construction of the terminal assembly 17.

The intermediate agitating assembly 16 comprises a hollow draft tube 20 mounted coaxially in the shell 11 and cooperating therewith to define therebetween an annular cylndrical passage 21. A series of inlet ports 22, 22 are provided with the draft tube 20 adjacent its upper end for admitting the process materials into its interior from the passage 21. A series of outlet ports 23, 23 are provided adjacent the lower end of the draft tube 20 for exhausting the reacted process materials from the interior of the draft tube 20.

In order to admit process materials into the passage 21, the lower end of the passage 21 communicates with the upper end of the draft tube 24 in the lower agitating assembly 15. The upper end of the passage 21 is blocked by means of a transverse annular partition 25 which also serves as means to mount the draft tube 20 in the shell 11. The partition 25 diverts process materials flowing upwardly in the passage 21 into the inlet ports 22, 22. In the present instance, the juncture of the partition 25 with the shell 11 is filleted at 25a and 25b to prevent process material from accumulating at such locations. With this structure, a portion of the process materials entering the inlet ports 22, 22 at the upper end of the draft tube 20 is flowed downwardly in the draft tube 20 to exit from the outlet ports 23, 23 and another portion of the process ingredients entering the inlet ports 22, 22 of the draft tube 20 flows into the lower end of the annular passage 26 surrounding the axially-adjacent terminal agitating assembly 17.

For the purpose of flowing the process materials downwardly in the draft tube 20, pumping means is provided. In the illustrated embodiment, the pumping means includes an impeller 30 mounted for rotation on a shaft 31 extending coaxially with the longitudinal axis of the shell 11 and supported in bearings 32 and 33 at the lower and upper ends, respectively, of the shell 11. The impeller 30 includes a sereis of flat blades 34, 34 (FIG. 2) which extend radially outward from its hub 35. Preferably, the planes of the blades 34, 34 intersect the rotational axis of the shaft 31; however, in some instances, the blades 34, 34 may be curved and disposed in planes which are at angles with respect to the rotational axis of the shaft 31 to improve further the agitating action in the assembly. With this structure, rotation of the shaft 31 causes the impeller 30 to force process materials outwardly through the outlet ports 23, 23.

In order to ensure displacement of the process materials downwardly through the draft tube 20 and to prevent short-circuiting of incoming process materials around the impeller 30 and the outlet ports 23, 23, baffle means is provided. In the present instance, the baffle means includes a circular plate 40 extending across the bottom of the impeller 30 and into proximity with the bottom edge 42 of the draft tube 20. The plate 40 operates to prevent process materials from flowing upwardly into the impeller 30 from the inside of the draft tube 24 of the initial agitating assembly 15 and to ensure that process materials inside the draft tube 20 are flowed downwardly therethrough before being discharged through the output ports 23, 23. It is noted, however, that the impeller 39 associated with the initial agitating assembly 15 does not mount a plate like the plate 40 because at this stage, it is desirable for the impeller 39 to draw process materials in opposite directions downwardly through the draft tube 24 and upwardly from the inlet 12 before discharging the material through the outlet ports 26, 26 in the draft tube 24. It is noted that the blades 34, 34 of the impeller 30 terminate in closely-spaced relation with the inside of the draft tube 20 to effect a mechanical-shearing action on the process materials as they are expelled from the outlet ports 23, 23.

For the purpose of promoting agitation in the apparatus 10, the baffle means further includes a series of vanes 45, 45 associated with the outlet ports 23, 23 to minimize swirling in the flow of process materials exiting from the ports 23, 23. In the present instance, the ports 23, 23 are rectangular and are vertically elongated, and the vanes 45, 45 are mounted at peripherally-spaced locations to the outside of the draft tube. Each vane 45 is flat and is inclined in a plane which is disposed at an acute angle with respect to the rotational axis of the shaft 31. For example, see FIG. 4, which is a developed view of the lower portion of the draft tube 20. Preferably, the angle is 45°, and the vanes 45, 45 are pitched to cause tangentially flowing portions of the process materials to be directed downwardly at the periphery of the draft tube 20 as the materials exit the outlet ports 23, 23. Thus, process materials exiting from the ports 23, 23 flow into a mixing zone 43 and are there conjoined with process materials supplied from the draft tube 24 of the initial agitating assembly 15. The conjoined materials enter the passage 21 for re-admission into the draft tube 20 through the inlet ports 22, 22, substantially as illustrated by the flow arrows in FIG. 1.

Depending on the nature of the reaction taking place in the reactor 10, it may be desirable to supply heat or to remove heat from the process materials as they advance through the reactor 10. To this end, heat exchange means is mounted in the annular passage around the draft tube in one or more of the agitating assemblies, such as the assembly 16. In the illustrated embodiment, the heat exchange means for the assembly 16 includes a helical tube 46 surrounding the draft tube 20 in the passage 21 for contacting process materials directly and transferring heat relative thereto. Heat exchange means which may be also used satisfactorily with one or more of the agitating assemblies includes a hollow jacket 47 (FIG. 3) which surrounds the shell 11 and the initial agitating assembly 15. A heat transfer fluid is flowed through the jacket 47 to transfer heat with respect to the flowing process materials. With this structure, heat may be either supplied to or removed from the reacting materials depending on whether or not the reactions are endothermic or exothermic, respectively, and the desired temperature to be maintained in the reactor 10.

In operation in the steady state, process materials, such as resins to be polymerized, are admitted under pressure into the reactor 10 through the inlet 12. The impeller 39 in the initial agitating assembly 15 causes a portion of the inflowing materials to be mixed with another portion of materials flowing downwardly through the lower draft tube 24. The mixed materials exiting from the outlet ports 26, 26 of the initial draft tube 24 are then flowed upwardly around the draft tube 24 into its inlet ports 27, 27 where one portion of the process materials flows downwardly through the draft tube 24 and another portion flows upwardly for passage through the intermediate agitating assembly 16.

The baffle plate 40 on the bottom of the impeller 30 in the intermediate agitating assembly 16 causes the upwardly-flowing process materials to flow radially outward toward the lower portion of the passage 21 where they are conjoined with process materials being discharged downwardly through the vanes 45 surrounding the outlet ports 23, 23 in the lower end of the intermediate draft tube 20. The process materials flowing into the inlet ports 22, 22 of the draft tube 20 are split, with one portion being recycled through the draft tube 20 and another portion being flowed upwardly to the terminal agitating assembly 17. The agitating action which takes place in the terminal assembly 17 is similar to that which takes place in the intermediate assembly 16, except, of course, that a portion of the process materials recirculating in the terminal agitating assembly is discharged through the outlet 13. If desired, heat may be transferred to or from the process materials by the heat transfer means 46 and 47 while the process materials are being reacted in order to maintain a desired thermal equilibrium in the reactor 10.

In view of the foregoing, it should be apparent that with the reactor of the present invention, the degree of reaction of the process materials may be predicted with reasonable accuracy because the residence time of the process materials in the reactor is controlled. Thus, when the reactor is associated with modern on-line composition analyzers and computers, the production of chemicals on a continuous basis is improved.

While a preferred embodiment of the present invention has been described in detail, various modifications, alterations and changes may be made without departing from the spirit and scope of the present invention as defined in the appended claims.

For example, in the present instance a three stage reactor is illustrated. It should be understood, however, that a greater or lesser number of stages may be provided in a common vessel, within limits of practicality. Moreover, in the illustrated embodiment, upward flow through the reactor is illustrated; however, it should be understood that the flow may be downwardly and through side inlets and outlets, depending on the kinetics and stoichiometry of the reaction taking place in the reactor.

I claim:

1. A continuous-flow agitated reactor, comprising: a shell having an inlet and an outlet for process material, at least one agitating assembly mounted in said shell for mixing said material and reacting the same, said assembly including a draft tube mounted in said shell and spaced therefrom to define an annular flow passage therebetween, inlet port means in said draft tube adjacent one end for admitting said process material into said draft tube from said flow passage, said inlet port means being disposed around the entire periphery of said draft tube for providing fluid communication between the annular passage and the interior of the draft tube, outlet port means in said draft tube adjacent the other end for exhausting said process material from said draft tube, said outlet port means being disposed around the entire periphery of said draft tube for providing fluid communication between the annular passage and the interior of the draft tube, pumping means located adjacent said outlet port means for operating on said material to flow said material longitudinally through said draft tube from said inlet port means, said pumping means including an impeller mounted in said draft tube in substantial registry with said outlet port means and baffle means associated with said outlet port means and pumping means for redirecting the material flowing longitudinally through the draft tube to flow said material through said outlet port means and into said annular flow passage, said pumping and baffle means cooperating to establish a predetermined recirculation through said outlet ports for process materials from said draft tube with said materials flowing longitudinally in said annular passage in a direction opposite to the flow direction in said draft tube.

2. A reactor according to claim 1 including heat-transfer means surrounding said draft tube for transferring heat relative to said material as it advances through said flow passage before entering said inlet ports.

3. A reactor according to claim 1 wherein said pumping means includes a shaft extending longitudinally in said draft tube for rotating said impeller, and said baffle means includes a plate extending across said impeller on the side thereof remote from the inlet ports of said draft tube, said plate extending substantially across one end of said draft tube so that upon rotation of said impeller the process material is expelled radially outwardly through said outlet port means.

4. A reactor according to claim 3 wherein said impeller includes a series of blades extending radially outward from said shaft and terminating in closely spaced relation with the inside of said draft tube adjacent said outlet ports for effecting a mechanical-shear action on process materials while expelling the same from the outlet ports.

5. A continuous-flow agitated reactor, comprising: a shell having an inlet and an outlet for process material, at least one agitating assembly mounted in said shell for mixing said material and reacting the same, said assembly including a draft tube mounted in said shell and spaced therefrom to define a flow passage therebetween, means providing a series of inlet ports in said draft tube adjacent one end for admitting said process material into said draft tube from said flow passage, means providing a series of outlet ports in said draft tube adjacent the other end for exhausting said process material from said draft tube, pumping means located adjacent said outlet ports for operating on said material to flow said material longitudinally through said draft tube from said inlet ports, and baffle means associated with said outlet ports and pumping means for redirecting the material flowing longitudinally through the draft tube to flow said material through said outlet ports, said pumping means including an impeller mounted in said draft tube in substantial registry with said outlet port means, means including a shaft extending longitudinally in said draft tube for rotating said impeller, said baffle means including a plate extending across said impeller on the side thereof remote from the inlet ports of said draft tube, said plate extending substantially across one end of said draft tube so that upon rotation of said impeller the process material is expelled radially outward through said outlet port means, said baffle means further including a series of vanes disposed adjacent said outlet ports for redirecting process materials existing from said ports to prevent the same from swirling.

6. A reactor according to claim 5 wherein said series of vanes are mounted at peripherally-spaced locations to said draft tube and each is inclined in a plane disposed at an acute angle with respect to said shaft to cause process materials flowing from the draft tube to be redirected to flow axially at the periphery of the draft tube.

7. A reactor according to claim 1 including at least a second like agitating assembly mounted in said shell and spaced longitudinally from said first-mentioned assembly, said second assembly having inlet and outlet port means and being mounted in said shell with its outlet port means axially adjacent the inlet port means of said first-mentioned assembly, and means providing a partition in said flow passage, said partition extending inwardly from said shell and being located in a plane intermediate said adjacent assembiles, said partition causing said process material to flow into the inlet port means of the draft tube of the first assemby, with the predetermined recirculated portion of said process material from said inlet port means flowing axially in one direction toward said outlet ports therein and the remaining portion from said inlet port means flowing axially in the opposite direction toward said assembly.

8. A reactor according to claim 7 including means mounting each draft tube adjacent its inlet port means to its associated partition means.

9. A reactor according to claim 1 wherein said inlet and outlet for said process material are located at opposite ends of said shell, and including an inlet agitating assembly like in structure to said first-mentioned agitating assembly and mounted adjacent said inlet to said shell, said pumping means of said inlet agitating assembly including a rotary member having blade means for flowing said process material axially in opposite directions thereinto and radially outward therefrom through the port means of said inlet agitating assembly.

References Cited
UNITED STATES PATENTS

| | | | |
|---|---|---|---|
| 2,847,200 | 8/1958 | Ung | 261—84 |
| 3,409,408 | 11/1968 | Ballestra | 23—283 |

JAMES H. TAYMAN, Jr., Primary Examiner

U.S. Cl. X.R.

23—285, 270.5; 259—8, 23, 24, 44, 95, 96, 108; 261—83, 84, 89

UNITED STATES PATENT OFFICE
CERTIFICATE OF CORRECTION

Patent No. 3,752,653          Dated August 14, 1973

Inventor(s) Arthur P. Weber

It is certified that error appears in the above-identified patent and that said Letters Patent are hereby corrected as shown below:

Column 6, line 21, change "existing" to --exiting--;
         line 38, change "assembiles" to --assemblies--;
         line 44, after "said" insert --second--.

Signed and sealed this 30th day of April 1974.

(SEAL)
Attest:

EDWARD M. FLETCHER, JR.
Attesting Officer

C. MARSHALL DANN
Commissioner of Patents